(12) United States Patent
Ueshima et al.

(10) Patent No.: US 7,156,742 B2
(45) Date of Patent: Jan. 2, 2007

(54) MEMORY CARTRIDGE SYSTEM

(75) Inventors: Hiromu Ueshima, Kusatsu (JP);
Yoshiaki Nakanishi, Kusatsu (JP);
Masaki Ohashi, Kusatsu (JP)

(73) Assignee: SSD Company Limited, Shiga (JP)

( * ) Notice: Subject to any disclaimer, the term of this patent is extended or adjusted under 35 U.S.C. 154(b) by 185 days.

(21) Appl. No.: 09/981,967

(22) Filed: Oct. 19, 2001

(65) Prior Publication Data
US 2002/0055387 A1 May 9, 2002

(30) Foreign Application Priority Data
Oct. 19, 2000 (JP) ............................. 2000-319889

(51) Int. Cl.
*A63F 9/24* (2006.01)
(52) U.S. Cl. ...................................... 463/43
(58) Field of Classification Search ............ 463/43–45; 434/307 A–307 R; 711/103, 115, 202; 84/601, 84/602
See application file for complete search history.

(56) References Cited

U.S. PATENT DOCUMENTS

| 5,608,905 | A | * | 3/1997 | Weinstein ................ 707/205 |
| 5,624,316 | A | | 4/1997 | Roskowski et al. |
| 5,648,628 | A | * | 7/1997 | Ng et al. ................. 434/307 A |
| 5,664,778 | A | * | 9/1997 | Kikuchi et al. ............... 463/40 |
| 5,815,144 | A | | 9/1998 | Strothmann |
| 5,838,577 | A | * | 11/1998 | Tokano ........................ 702/60 |
| 6,141,730 | A | * | 10/2000 | Nishiumi et al. ........... 711/115 |
| 6,328,570 | B1 | * | 12/2001 | Ng ........................... 434/307 A |
| 2001/0010067 | A1 | | 7/2001 | Nishiumi et al. |

FOREIGN PATENT DOCUMENTS

EP 0 875 816 A2 11/1998

* cited by examiner

Primary Examiner—John M. Hotaling, II
Assistant Examiner—Robert Mosser
(74) Attorney, Agent, or Firm—Arent Fox PLLC

(57) ABSTRACT

A memory cartridge system includes a main body, and a main body ROM incorporated in the main body is stored with a warning message display program, and a memory cartridge attachable to or detachable from the main body is stored with a karaoke program. When the memory cartridge is not attached, the warning message display program is mapped to an address space in a first manner, whereby the warning message display program is started. On the other hand, when the memory cartridge is attached, the warning message display program and the karaoke program are mapped to the address space in a second manner, whereby the karaoke program can be started.

12 Claims, 18 Drawing Sheets

MEMORY CARTRIDGE SYSTEM

BACKGROUND OF THE INVENTION

1. Field of the Invention

The present invention relates to a memory cartridge system. More specifically, the present invention relates to a memory cartridge system applied to a home game apparatus or a home karaoke device to process a program stored in the memory cartridge when the memory cartridge is attached or inserted.

2. Description of the Prior Art

In a conventional home game apparatus, all the programs and data are stored in a memory cartridge ROM and no program and data are stored in a main body ROM. That is, a common program and common data commonly executed and proceed for all the kinds of memory cartridges are stored in not the main body ROM but the cartridge ROM. However, if the common program and the common data are stored in the cartridge ROM, there was a problem that it is necessary to increase a capacity of the ROM in proportion to them, and thus price of the cartridge becomes high.

On the other hand, as a recent home karaoke device, there are devices that store a common program and common data in a main body ROM and music data in a cartridge ROM. In such devices it is possible to minimize a memory capacity of the cartridge ROM.

However, even if such a home karaoke device is, it is impossible to start different programs depending on whether the cartridge is attached or not.

In addition, a conventional memory cartridge could not be used for various kinds of devices. For example, it is impossible to use a memory cartridge of a home karaoke device as a memory cartridge of a home game apparatus, or a memory cartridge of a home game apparatus as a memory cartridge of a home karaoke device.

SUMMARY OF THE INVENTION

Therefore, it is a primary object of the present invention to provide a memory cartridge system capable of restraining a capacity of a cartridge memory and start different programs depending on whether a cartridge is attached or not.

It is another object of the present invention to provide a memory cartridge capable of being applied to such a memory cartridge system.

It is another object of the present invention to provide a memory cartridge capable of being available in various kinds of devices.

A memory cartridge system according to the present invention is a system that a memory cartridge stored with a second start program is detachably attached to a main body incorporating a main body memory stored with a first start program, and comprises: first mapping means for mapping the first start program to an address space in a first manner when the memory cartridge is not attached; and second mapping means for mapping the first start program and the second start program to an address space in a second manner when the memory cartridge is attached.

In one aspect, the present invention is a home game apparatus that a memory cartridge stored with a second start program is detachably attached to a main body incorporating a main body memory stored with a first start program, and comprises: first mapping means for mapping the first start program to an address space in a first manner when the memory cartridge is not attached; and second mapping means for mapping the first start program and the second start program to an address space in a second manner when the memory cartridge is attached.

In another aspect, the present invention is a home karaoke device that a memory cartridge stored with a second start program is detachably attached to a main body incorporating a main body memory stored with a first start program, and comprises: first mapping means for mapping the first start program to an address space in a first manner when the memory cartridge is not attached; and second mapping means for mapping the first start program and the second start program to an address space in a second manner when the memory cartridge is attached.

The main body memory incorporated in the main body is stored with the first start program, and the memory cartridge attached to or detached from the main body is stored with the second start program. The first start program is mapped to the address space in the first manner when the memory cartridge is not attached, and the first start program and the second start program are mapped to the address space in the second manner when the memory cartridge is attached.

In a preferred example, at a time of start, first enable signal applying means applies a first enable signal to the main body memory or the memory cartridge. That is, when the memory cartridge is not inserted or attached, the first enable signal is applied to the main body memory, and when the memory cartridge is inserted or attached, the fist enable signal is applied to the memory cartridge.

More preferably, when the memory cartridge is attached, second enable signal applying means applies a second enable signal to the main body memory. Accordingly, when the memory cartridge is attached, the first enable signal is applied to the memory cartridge and the second enable signal is applied to the main body memory.

In another preferred example, the first enable signal is outputted from a first enable output terminal provided on the main body, and the second enable signal is outputted from a second enable output terminal. When the memory cartridge is not attached, the first enable output terminal and a first enable input terminal of the main body memory are connected by a first connecting member. When the memory cartridge is attached to the main body, a connection release member of the memory cartridge acts on the first connecting member, whereby a connected state between the first enable output terminal and the first enable input terminal is released. Meanwhile, a second enable output terminal and the first enable input terminal are connected by a second connecting member of the memory cartridge. The first enable signal is inputted to the second enable input terminal of the memory cartridge.

In a further preferred example, the main body memory is stored with an identifier to identify the main body, and the memory cartridge is stored with a plurality of programs corresponding to different main bodies. At this time, the first start program includes a program to judge the identifier stored in the main body memory.

According to the present invention, since the first start program is mapped to the address space in the first manner when no memory cartridge is attached, and the first start program of the main body memory and the second start program of the memory cartridge are mapped to the address space in the second manner when the memory cartridge is attached, it is possible to restrain the capacity of the cartridge memory, and it is possible to start or activate different programs depending on whether the cartridge is attached or not.

In another aspect, the present invention is a memory cartridge detachably attached to a main body having a first enable output terminal for outputting a first enable signal, a second enable output terminal for outputting a second enable signal, and a first connecting member for connecting the first enable output terminal and a first enable input terminal of a main body memory stored with a first start program, comprising: a cartridge memory which is stored with a second start program; a connection release member which releases a connected state between the first enable output terminal and the first enable input terminal by acting on the first connecting member upon being attached to the main body, a second connecting member which connects the second enable output terminal and the first enable input terminal upon being attached to the main body, and a second enable input terminal which inputs the first enable signal upon being attached to the main body.

In this aspect, the first enable signal is outputted from the first enable output terminal of the main body, and the second enable signal is outputted from the second enable output terminal. The first enable input terminal of the main body memory stored with the first start program is connected with the first enable output terminal by the first connecting member. When the memory cartridge having the cartridge memory stored with the second start program is attached to the main body, the connection release member acts on the first connecting member, and therefore, the connected state between the first enable output terminal and the first enable input terminal is released. Meanwhile, the second enable output terminal and the first enable input terminal are connected by the second connecting member. The first enable signal outputted from the first enable output terminal is inputted to the second enable input terminal of the memory cartridge.

In other words, when the memory cartridge is not attached, the first enable signal is applied to the main body memory. When the memory cartridge is attached, the first enable signal is applied to the memory cartridge, and the second enable signal is applied to the main body memory. The first start program and second start program stored in the main body memory and the cartridge memory respectively are read out in response to the applied enable signals.

Accordingly, since the first enable signal is applied to the main body memory when the memory cartridge is not attached, and the first enable signal and the second enable signal are respectively applied to the memory cartridge and the main body memory when the memory cartridge is attached, it is possible to restrain the capacity of the cartridge memory and it is possible to activate different programs depending on whether the cartridge is attached or not.

In another aspect, the present invention is a memory cartridge detachably attached to a main body having an identifier, and stored with a program to allow the main body execute, the program comprising: a plurality of first programs corresponding to the different identifiers; and a second program which selectively enables the plurality of first programs by identifying the identifier which the main body has.

In this aspect, the main body has the identifier, and the memory cartridge attachable to or detachable from the main body stores programs to allow the main body to execute. The program stored in the memory cartridge includes the plurality of the first programs corresponding to different identifiers and the second program to selectively validate the plurality of first programs by identifying identifier of the main body. Accordingly, depending on a device to which the memory cartridge is attached, a different first program is started.

Accordingly, since a different first program is started depending on the main body to which the memory cartridge is attached, it is possible to use the memory cartridge in a various kinds of devices.

The above-described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
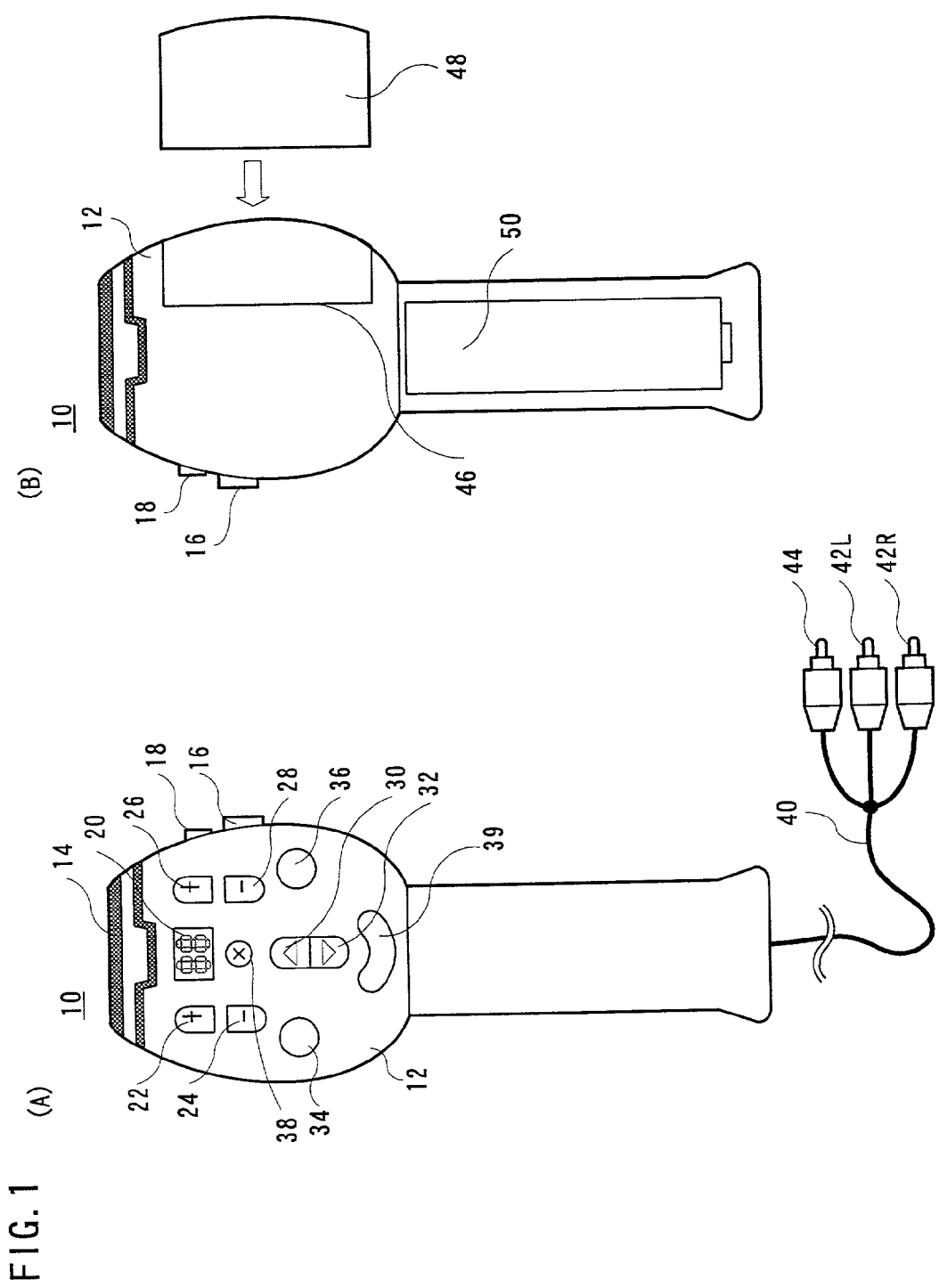
FIG. 1 is an appearance view showing one example of a karaoke device with built-in microphone.

Referring to FIG. 1, a karaoke device with built-in microphone (home karaoke device) 10 according to this embodiment includes a housing (main body) 12 having an egg-shaped upper portion and a cylindrical lower portion, and a microphone 14 is mounted at an upper end of the egg-shaped portion of the housing 12. On an upper portion of the housing 12, i.e. the egg-shaped portion, a power switch 16 and a reset switch 18 are provided. The power switch 16 is a switch for turning on/off a power, and the reset switch 18 is a switch for resetting a whole process including selected music number.

Furthermore, a display 20 formed of a two-digit seven segment LED is provided on the egg-shaped portion of the housing 12, and on a left side that sandwiches the display 20 tempo control keys 22 and 24 are provided in an aligned fashion in a vertical direction, and on a right side BGM volume control keys 26 and 28 are provided in an aligned fashion in a vertical direction. The display 20 is utilized to show a music number selected by a user. The tempo control keys 22 and 24 are keys for increasing or decreasing a reproduction speed (tempo) of the karaoke, i.e. BGM. The BGM volume control keys 26 and 28 are keys to increase or decrease a reproduced sound magnitude (volume) of the karaoke, i.e. BGM.

Music selection/pitch control keys 30 and 32 are provided at a center, slightly lower portion of the egg-shaped portion of the housing 12. The music selection/pitch control keys 30 and 32 are utilized to increment or decrement a music number, and also utilized to raise or lower a karaoke pitch frequency, i.e. a tone in tune in accordance with the user's tone one by one degree, for example.

An echo mode selection key 34 is provided at a left of the music selection/pitch control keys 30 and 32 and below the tempo control keys 22 and 24 on the egg-shaped potion of the housing 12. The echo mode selection key 34 is utilized to selectively set an echo time (delay time) in an echo mode. In this embodiment, it is possible to set echo mode 1, echo mode 2 and echo mode 3, and the echo time is set as "short", "medium" and "long", respectively.

A voice effect mode selection key 36 is provided at a right of the music selection/pitch control keys 30 and 32 and the below the BGM volume control keys 26 and 28 on the egg-shaped portion of the housing 12. The voice effect mode selection key 36 can set voice effect mode 1, voice effect mode 2 and voice effect mode 3 in this embodiment. The voice effect mode 1 is a mode for processing voices so as to raise a frequency of output voices with respect to a frequency of input voices, and the voice effect mode 2 is a mode for processing voices so as to lower a frequency of output voices with respect to a frequency of input voices. Furthermore, the voice effect mode 3 is a mode for processing voices so as to continuously and repeatedly change (sweep) a frequency of output voices upward and downward.

A cancellation key 38 is provided between the display 20 and the music selection/pitch control keys 30 and 32. The cancellation key 38 is a key for canceling the tempo set by the tempo control keys 22 and 24, the BGM volume set by the volume control keys 26 and 28, the music number and pitch set by the music selection/pitch control keys 30 and 32, the echo mode set by the echo mode selection key 34, and the voice effect mode set by the voice effect mode selection key 36. The cancellation key 38 is also used to stop a music being played.

A decision key 39 is provided below the music selection/pitch control keys 30 and 32. The decision key 39 is a key for deciding and enabling the tempo set by the tempo control keys 22 and 24, the BGM volume set by the volume control keys 26 and 28, the music number and the pitch set by the music selection/pitch control keys 30 and 32, and the voice effect mode set by the voice effect mode selection key 36.

An AV cord 40 is withdrawn from a lower portion of the housing 12, i.e. from a lower end of the cylindrical portion, and the AV cord 40 includes two audio output terminals 42L and 42R and one video output terminal 44. The audio output terminals 42L and 42R and the video output terminal 44 are connected to an AV terminal of a television monitor (not shown). Therefore, images or videos and voices of the karaoke device with built-in microphone 10 in this embodiment are outputted on the television monitor.

A cartridge connector 46 is provided on a rear surface of the housing 12 as shown in FIG. 1(B), and a memory cartridge 48 is removably attached to the cartridge connector 46. In addition, the karaoke device with built-in microphone 10 in this embodiment is driven by batteries, and therefore, a battery box 50 is provided at the lower cylindrical portion of the housing 12 as shown in FIG. 1(B).

Figure 2:
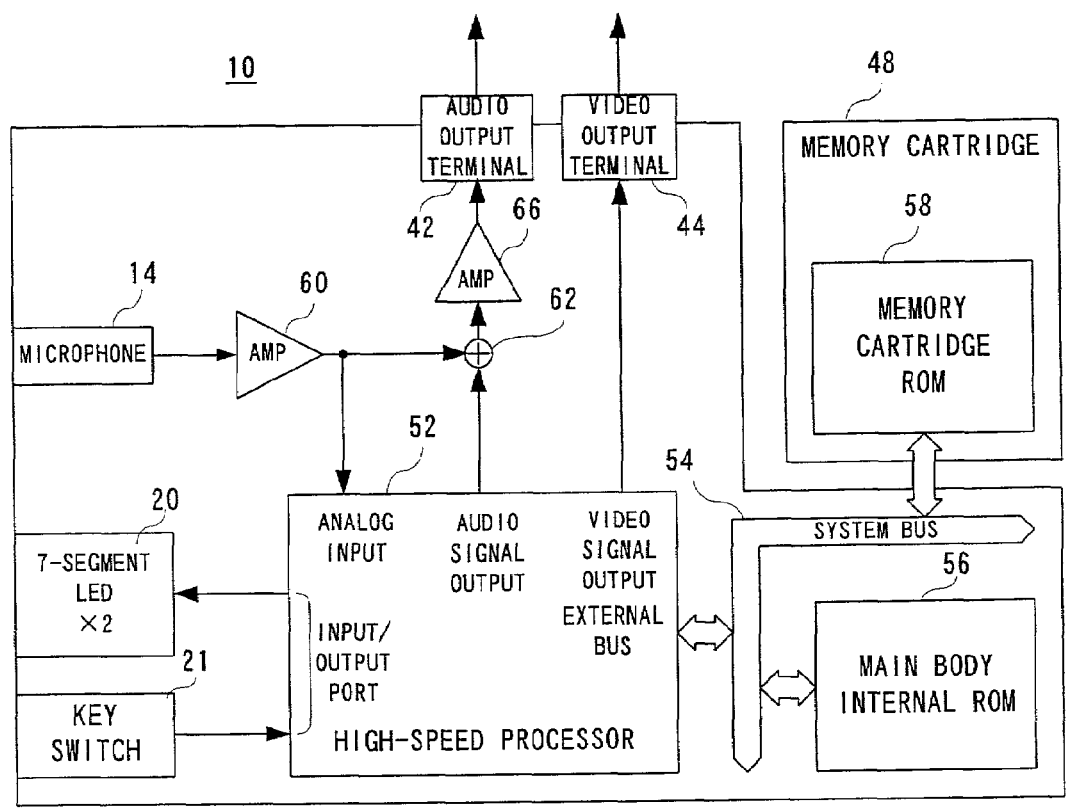
FIG. 2 is a block diagram showing a configuration of FIG. 1 embodiment.

Referring to FIG. 2, the karaoke device with built-in microphone 10 in this embodiment includes a processor 52 accommodated inside the housing 12. An arbitrary kind of processor can be utilized as the processor 52; however, in this embodiment a high-speed processor (trademark "XaviX") developed by the assignee of the present invention and already filed as a patent application is used. This high-speed processor is disclosed in detail in Japanese Patent Laying-open No. 10-307790 [G06F 13/36, 15/78] and U.S. patent application Ser. No. 09/019,277 corresponding thereto.

Although not shown, the processor 52 includes various processors such as a CPU, a graphic processor, a sound processor, a DMA processor and etc., and also includes an A/D converter used in fetching an analog signal and an input/output control circuit receiving an input signal such as a key operation signal and an infrared signal and giving an output signal to external devices. The CPU executes required arithmetic and logical operations in response to the input signals, and gives results to the graphics processor, the sound processor and etc. Therefore, the graphic processor and the sound processor execute image processing and audio processing according to the operation results.

A system bus 54 is connected to the processor 52, and an internal ROM 56 mounted on a circuit board (not shown) which is accommodated within the housing 12 together with the processor 52 and an external ROM 58 included in the memory cartridge 48 are connected to the system bus 54. Therefore, the processor 52 can access to the ROMs 56 and 58 through the system bus 54, and can retrieve video or image data and music data (score data for playing musical instruments) and so on.

As shown in FIG. 2, an audio or sound signal from the microphone 14 is applied to an analog input of the processor 52 through an amplifier 60. An analog audio signal which is a result of the processing by the sound processor potion of the processor 52 is outputted to the audio output terminals 42 (42L, 42R) shown in FIG. 1 through a mixer 62 and an amplifier 66. Furthermore, an analog image or video signal which is a result of the processing by the graphic processor (not shown) of the processor 52 is outputted to the video output terminal 44 shown in FIG. 1. In addition, display data is applied from an output port of the processor 52 to the display 20 shown in FIG. 1, and all switches and keys shown in FIG. 1 (herein shown generally by reference numeral 21) are connected to an input port of the processor 52.

Figure 3:
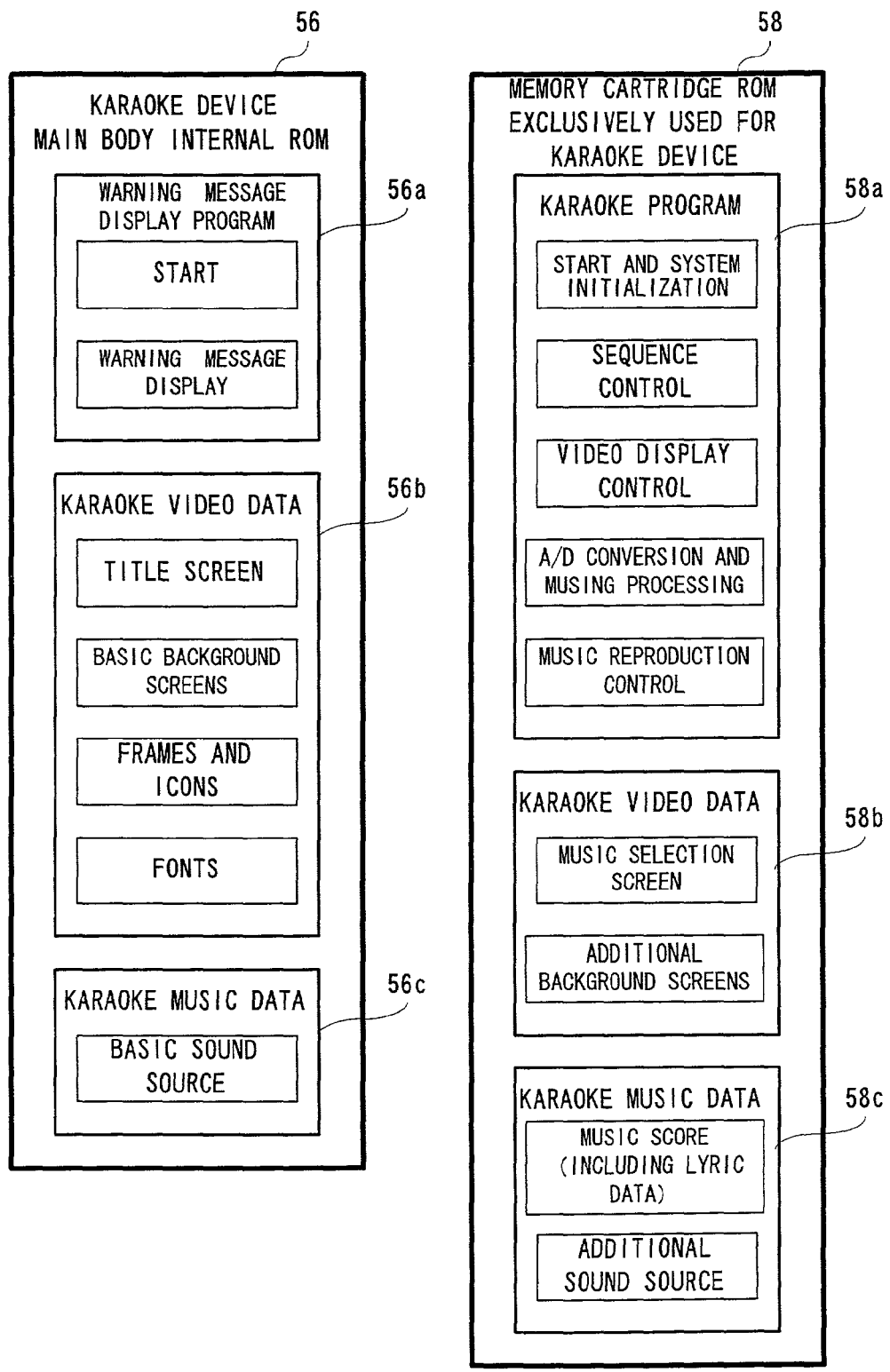
FIG. 3 is an illustrative view showing a stored state of a program and data in a main body internal ROM and a memory cartridge ROM.

Referring to FIG. 3, a description is made on a stored state of programs and data in the internal ROM 56 and the memory cartridge ROM 58. The ROM 56 is stored with a warning message display program 56a, karaoke video data 56b, and karaoke music data 56c. The warning message display program 56a is started when the power switch 16 is turned on in a state that the memory cartridge 48 is not attached or inserted, whereby a warning message is displayed on the television monitor. The karaoke video data 56*b* and the karaoke music data 56*c* are data commonly used for any music stored in the memory cartridge 48. The karaoke video data 56*b* includes title screen data, basic background screen data, frame and icon data, and font data. The karaoke music data 56*c* includes basic music source data.

The memory cartridge ROM 58 is stored with a karaoke program 58*a*, karaoke video data 58*b*, and karaoke music data 58*c*. When the power switch 16 is turned on in a state that the memory cartridge 48 is attached to the karaoke device with built-in microphone 10, the karaoke program 58*a* is started, and processing such as system initialization, sequence control, video display control, A/D conversion and music processing, music reproduction control, and etc. is executed. The karaoke video data 58*b* includes music selection screen data and additional background screen data. The karaoke music data 58*c* includes music script data (lyric data) and additional music source data. Both of karaoke video data 58*b* and karaoke music data 58*c* are used for processing of the karaoke program 58*a*.

Figure 4:
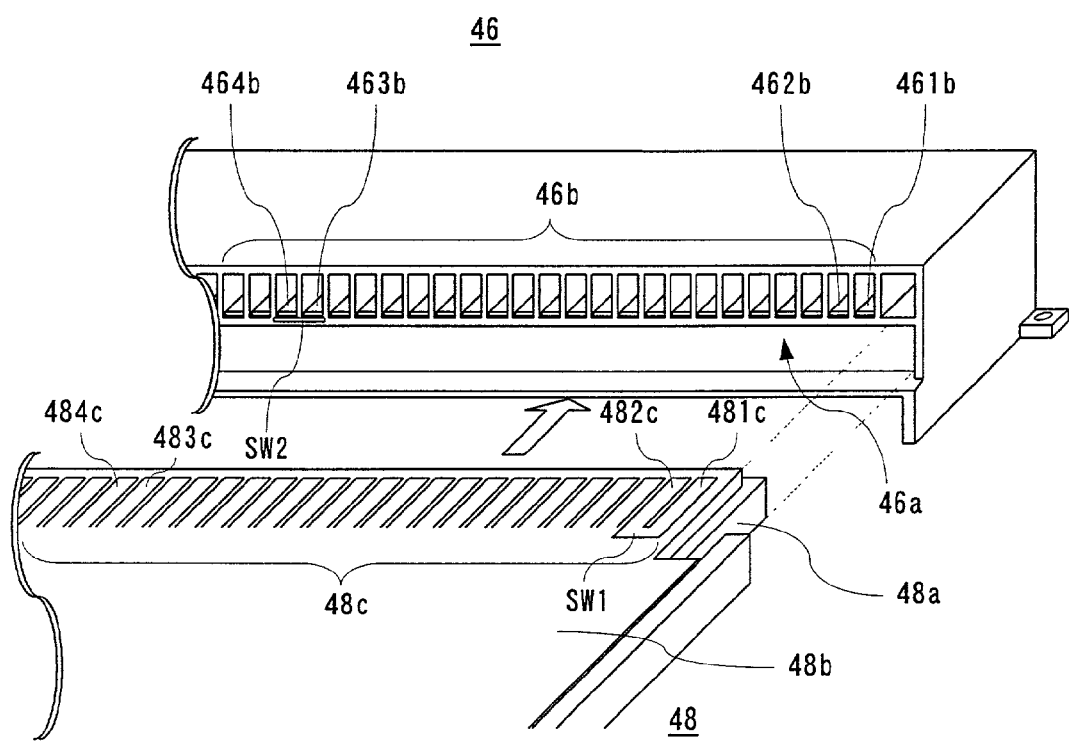
FIG. 4 is an appearance view showing shapes of a cartridge connector and a memory cartridge.
Figure 5:
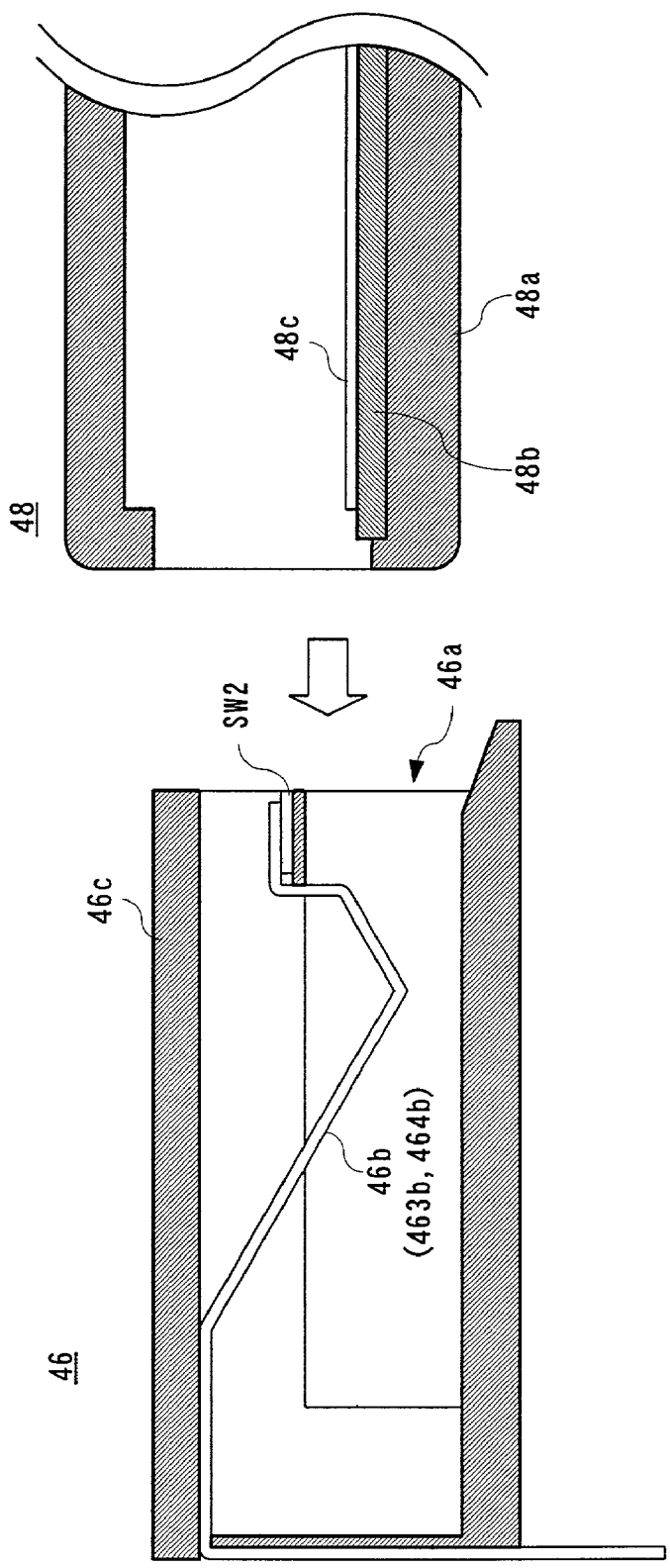
FIG. 5 is an illustrative view showing the shapes of the cartridge connector and the memory cartridge.

A configuration of the cartridge connector 46 and the memory cartridge 48 is shown in FIGS. 4 and 5. The memory cartridge 48 has a printed circuit board (hereinafter may be simply referred to as "PCB") 48*b* fixed on a lower housing 48*a*. The PCB 48*b* is formed with a plurality of cartridge terminals 48*c*, 48*c*, . . . on its surface while arranged in a width direction. Among them, two cartridge terminals 481*c* and 482*c* located at one end of the PCB 48*b* in the width direction are connected with each other, and composes a switch SW1.

On the other hand, the cartridge connector 46 is formed with an oblong inserting portion 46*a* to insert therein the tip end portions of the lower housing 48*a* and the PCB 48*b*, and a plurality of connector terminals 46*b*, 46*b*, . . . being arranged in the width direction are formed inside the inserting portion 46*a*. As can be understood from FIG. 5, each connector terminal 46*b* is brought into close contact with an upper housing 46*c* at a proper location of a longitudinal direction, and fixed there. The connector terminal 46*b* bends from the upper housing 46*c* to the inserting portion 46*a*, and bends toward the upper housing 46*c* again. A plurality of rectangular shaped openings through each of which one end of each connector terminal 46*b* is exposed are formed above the inserting portion 46*a* and arranged in the width direction.

A metallic piece is provided so as to cross over two openings at a proper location in the center of the width direction, and composes a switch SW2. Two connector terminals 463*b* and 464*b* being exposed through the two openings are electrically connected by the switch SW2 when no external force is applied.

If the tip end portions of the lower housing 48*a* and the PCB 48*b* are inserted into the inserting portion 46*a*, each connector terminal 46*b* is raised by the lower housing 48*a* and the PCB 48*b* and brought into contact with the each cartridge terminal 48*c* on the PCB 48*b*. Connector terminals 481*a* and 481*b* are brought into contact with the switch SW1, whereby the connector terminals 481*a* and 481*b* are short-circuited. On the other hand, connector terminals 463*b* and 464*b* are separated from the switch SW2, whereby the connector terminals 463*b* and 464*b* are opened. It is noted the connector terminals 463*b* and 464*b* are in contact with the cartridge terminals 483*c* and 483*d*; however, both of the cartridge terminals 483*c* and 483*d* are opened, and thus, the connector terminals 463*b* and 464*b* are never short-circuited.

Figure 6:
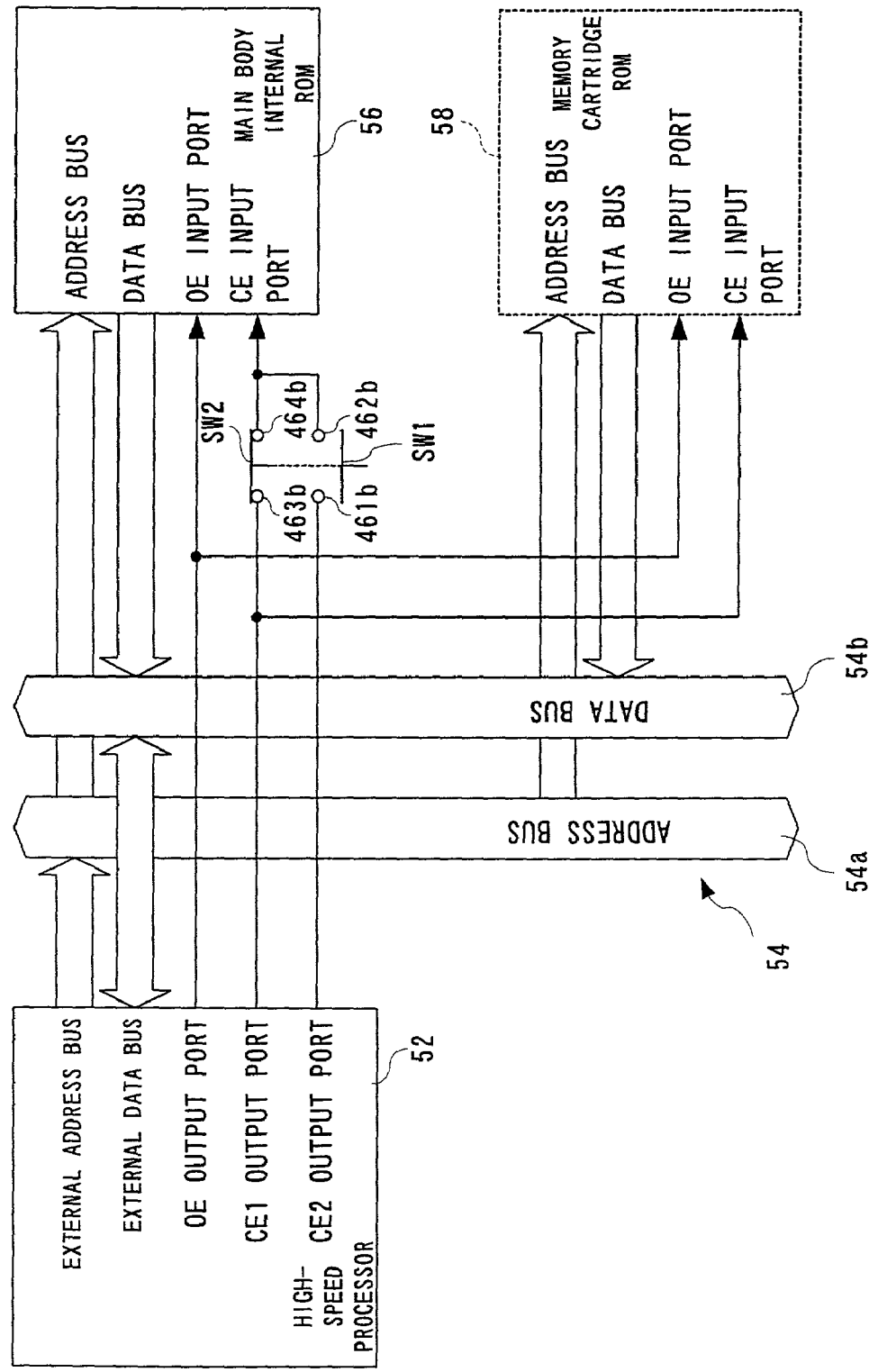
FIG. 6 is an illustrative view showing a connected state between a high-speed processor and the main body internal ROM.
Figure 7:
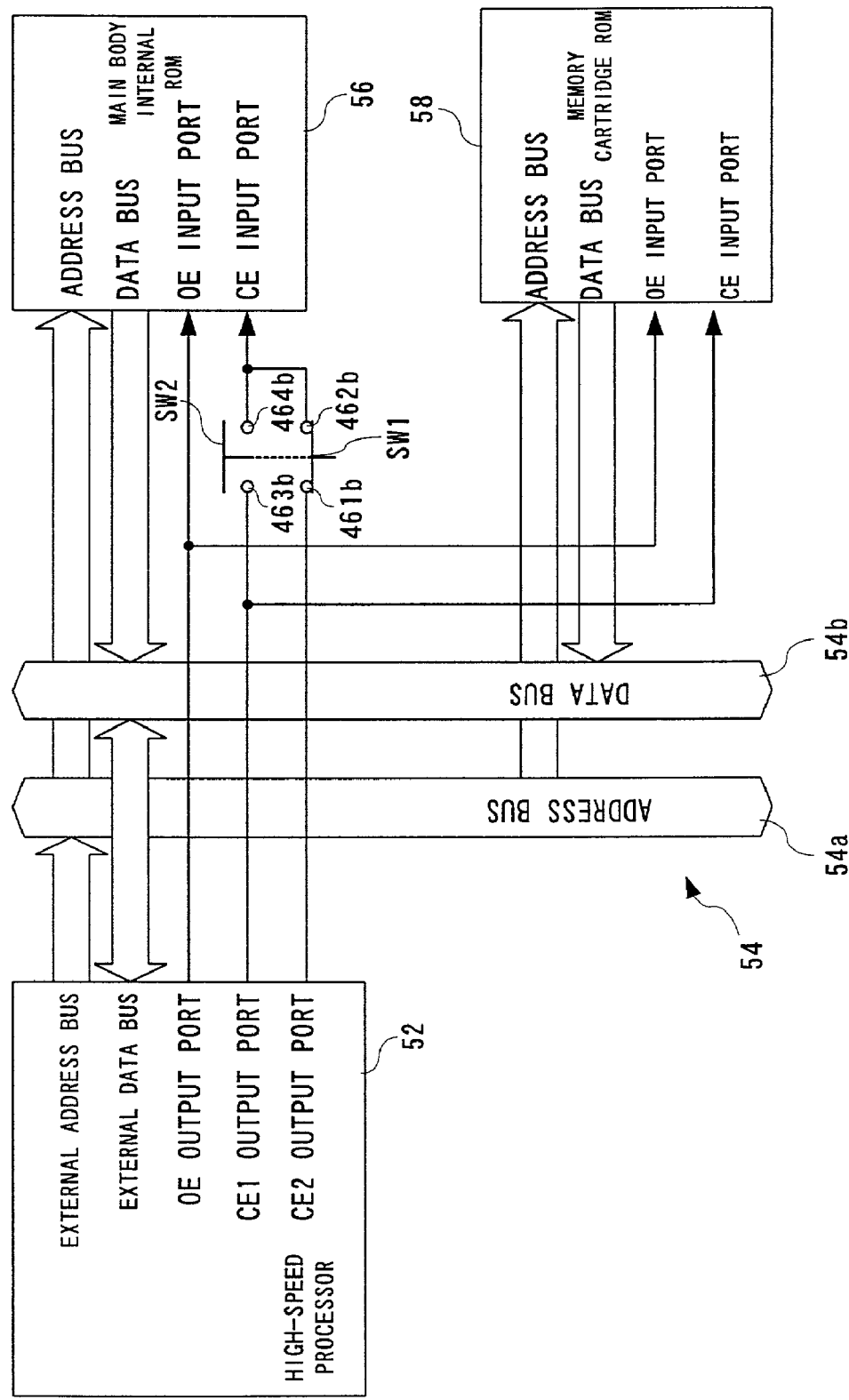
FIG. 7 is an illustrative view showing a connected state among the high-speed processor, the main body internal ROM and the memory cartridge ROM.

Referring to FIG. 6 and FIG. 7, an OE output port of the high-speed processor 52 is connected to OE input ports of the internal ROM 56 and the external ROM 58 (at the time the cartridge is attached). A CE1 output port of the high-speed processor 52 is connected to the connector terminal 463*b* and a CE input port of the external ROM 58 (at the time the cartridge is attached). A CE2 output port of the high-speed processor 52 is connected to the connector terminal 461*b*. On the other hand, a CE input port of the internal ROM 56 is connected to the connector terminals 462*b* and 464*b*. In addition, the system bus 54 includes an address bus 54*a* and a data bus 54*b* through which the high-speed processor 52, the internal ROM 56 and the external ROM 58 are connected with each other.

The high-speed processor 52 outputs a chip enable signal 1 or a chip enable signal 2 from the CE1 output port or the CE2 output port, an address signal through the address bus 54*a*, and an output enable signal from the OE output port. Respective internal ROM 56 and the external ROM 58, when inputting the chip enable signal 1 or the chip enable signal 2 from the CE input port, identify themselves as being selected to be an access destination, and output a data signal in response to the address signal and the output enable signal inputted at the appropriately same time as the time that chip enable signal is inputted. The data signal is applied to the high-speed processor 52 through the data bus 54*b*.

Figure 8:
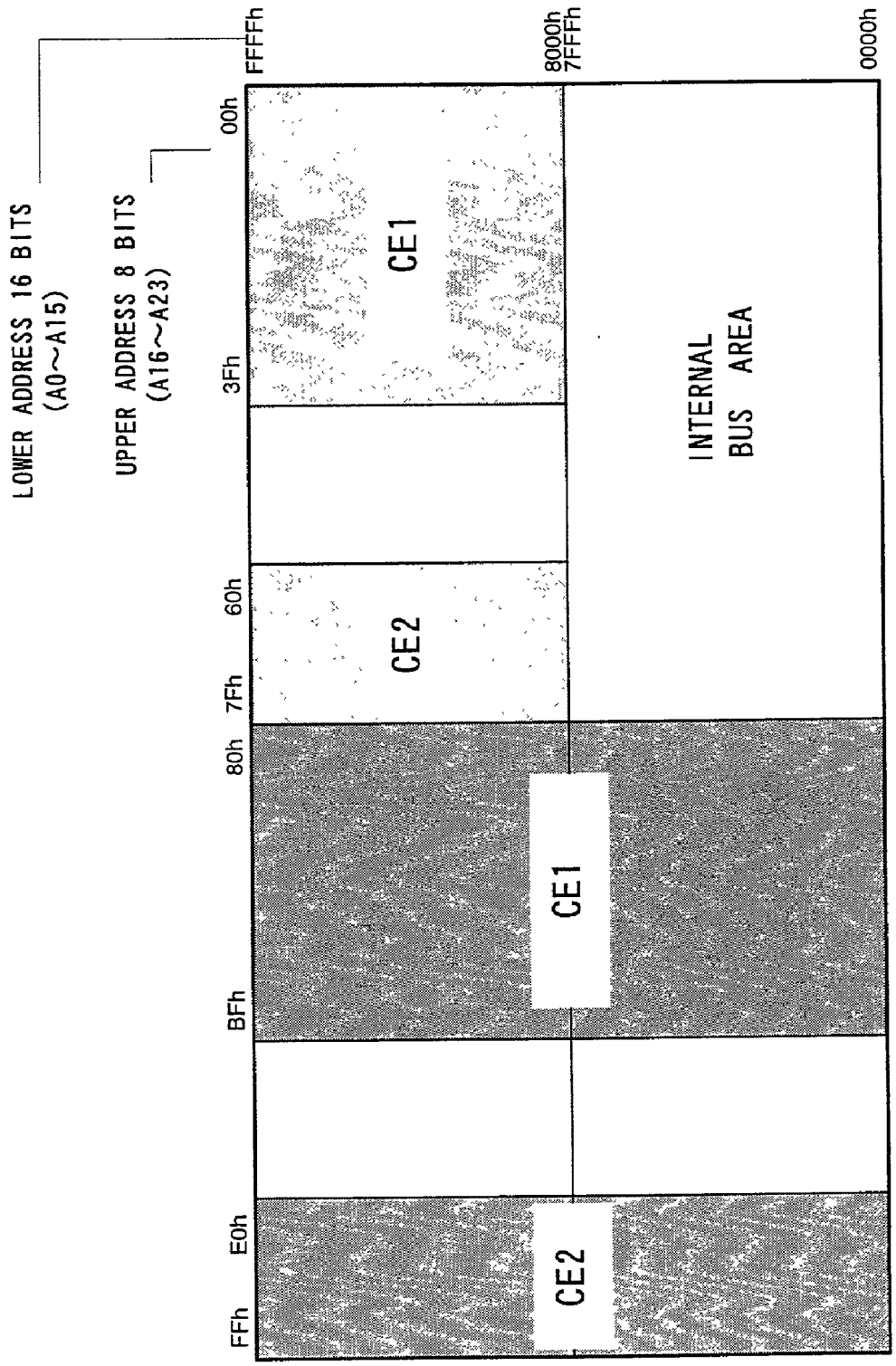
FIG. 8 is an illustrative view showing an address space when viewed from the high-speed processor.

The chip enable signal 1 and the chip enable signal 2 are outputted in correspondence to different address value. That is, referring to FIG. 8, when an address value of upper 8 bits indicates any of "00"-"3F" and an address value of lower 16 bits indicates any of "FFFF"-"8000" or when an address value of upper 8 bits indicates any of "80"-"BF", the chip enable signal 1 is outputted. On the other hand, when an address value of upper 8 bits indicates any of "60"-"7F" and an address value of lower 16 bits indicates any of "FFFF"-"8000" or when an address value of upper 8 bits indicates any of "E0"-"FF", the chip enable signal 2 is outputted.

Figure 9:
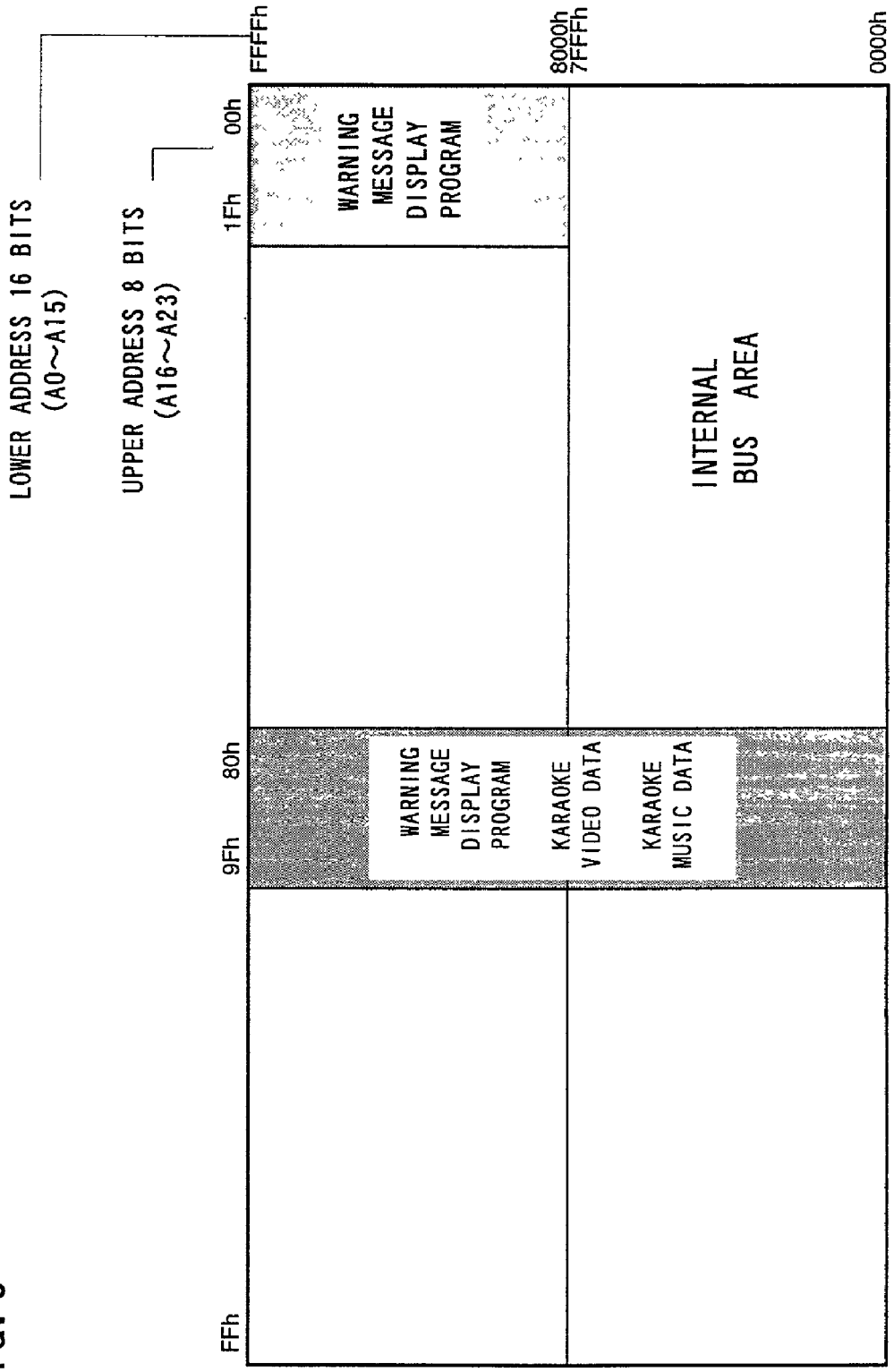
FIG. 9 is an illustrative view showing a mapping state of the address space when the memory cartridge is not attached.

When the memory cartridge 48 is not attached or inserted, the connector terminals 463*b* and 464*b* are in a short-circuited state by the switch SW2, and the connector terminals 461*b* and 462*b* are in an opened state. Thereupon, the chip enable signal 1 is inputted to the CE input port of the internal ROM 56, and the chip enable signal 2 is not inputted into any input port. Since the high-speed processor 52 outputs the chip enable signal 1 and the chip enable signal 2 according to the above-described manner, the warning message display program 56*a*, the karaoke video data 56*b*, and the karaoke music data 56*c* (referred to FIG. 3) read out of the internal ROM 56 are mapped as shown in FIG. 9.

The warning message display program 56*a* is mapped to an address space that the upper 8 bits indicate "00"-"1F" and the lower 16 bits indicate "FFFF"-"8000", and all the warning message display program 56*a*, the karaoke video data 56*b*, and the karaoke music data 56*c* are mapped to an address space that the upper 8 bits indicate "80"-"9F" and the lower 16 bits indicate "FFFF"-"0000". Since high-speed processor 52 starts to access from the upper 8 bits' address of "00", when the power is turned on in a state that the memory cartridge 48 is not attached or inserted, the warning message display program 56*a* is first executed.

Figure 10:
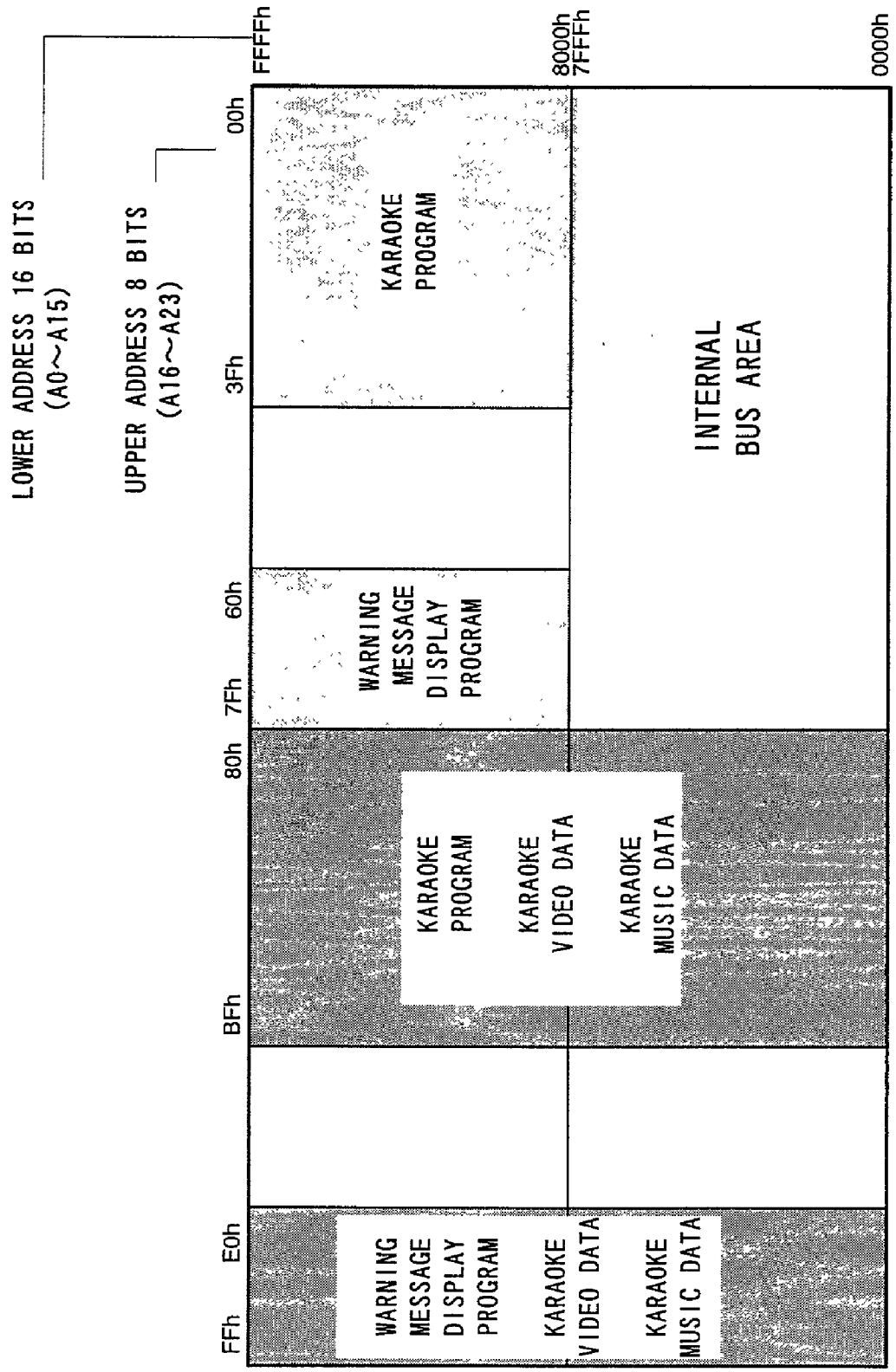
FIG. 10 is an illustrative view showing a mapping state of the address space when the memory cartridge is attached.

When the memory cartridge 48 is attached or inserted, the connector terminals 463*b* and 464*b* are in the opened state and the connector terminals 461*b* and 462*b* are in the short-circuited state by the switch SW2. At this time, the chip enable signal 2 is inputted to the CE input port of the internal ROM 56 and the chip enable signal 1 is inputted to the CE input port of the external ROM 58. The warning message display program 56a, the karaoke video data 56b and the karaoke music data 56c read out of the internal ROM 56, and the karaoke program 58a, the karaoke video data 58b and the karaoke music data 58c read out of the memory cartridge ROM 58 are mapped as shown in FIG. 10.

The warning message display program 56a is mapped to an address space that the upper 8 bits indicate "60"-"7F" and the lower 16 bits indicate "FFFF"-"8000", and the waning message display program 56a, the karaoke video data 56b and the karaoke music data 56c are mapped to an address space that the upper 8 bits indicate "E0"-"FF" and the lower 16 bits indicate "FFFF"-"0000". Meanwhile the karaoke program 58a is mapped to an address space that the upper 8 bits indicate "00"-"3F" and the lower 16 bits indicate "FFFF"-"8000", and the karaoke program 58a, the karaoke video data 58b and the karaoke music data 58c are mapped to an address space that the upper 8 bits indicate "80"-"BF" and the lower 16 bits indicate "FFFF"-"0000". Since the high-speed processor 52 starts to access from the upper 8 bits' address of "00", when the power is turned on in a state that the memory cartridge 48 is attached, the karaoke program 58a is first executed.

In this manner, since a mapping state of an address space viewed from the high-speed processor 52 differs depending on whether the memory cartridge 48 is attached or not, each of the programs stored in the main body internal ROM 56 and the memory cartridge ROM 58 can be properly started. If an update program or a modification program for updating or modifying data or programs stored in the main body internal ROM 56 is prepared in the memory cartridge ROM 58, the update program or the modification program is executed by attaching the memory cartridge 48, it is possible to change an output image or output sound.

Figure 11:
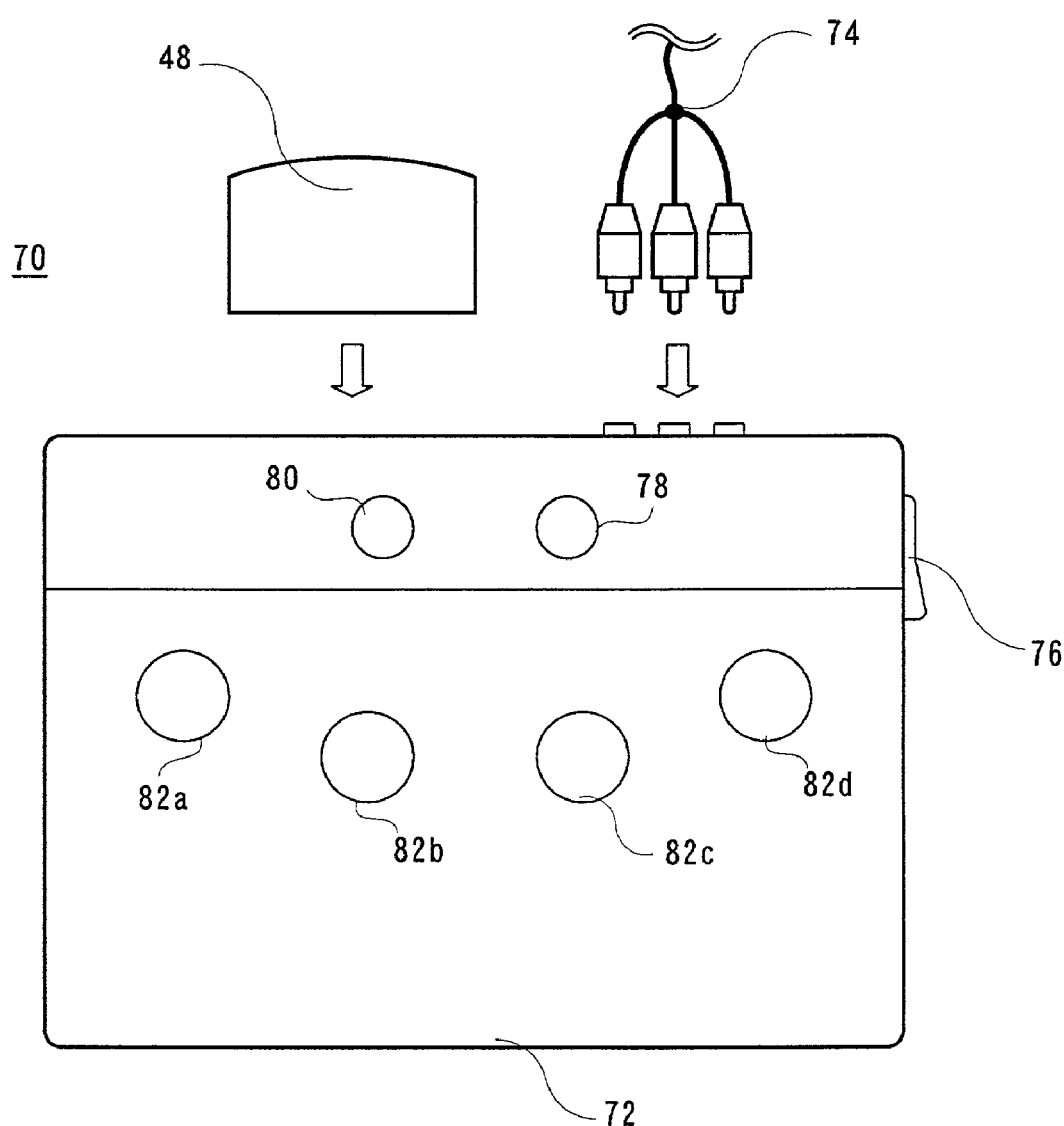
FIG. 11 is an appearance view showing one example of a ball paddle game device.

In another embodiment, the memory cartridge 48 is attached or inserted into the karaoke device built-in microphone 10 shown in FIG. 1 and a ball paddle game device (home game apparatus) 70 shown in FIG. 11, and used therein.

First, referring to FIG. 11, a description is made on the ball paddle game device 70. The ball paddle game device 70 includes a game console (main body) 72, and the game console 72 is applied with a direct current (DC) power by an AC/DC adaptor or a battery. The game console 72 is further connected to an AV terminal of a television monitor (not shown) by way of an AV cable 74.

The game console 72 has a housing made of a material such as plastic, for example, and is provided with the cartridge connector 46 shown in FIG. 4 on a side surface of the housing at a deeper side. The cartridge connector 46 is removably attached with the memory cartridge 48. A power switch 76 is provided on a right side surface of the housing, and a start key 78 and a music selection key 80 are placed on an upper surface of the housing at a deeper side. The start key 78 is operated at a start of a game. The music selection key 80 is to choose any of pieces of music stored or registered in advance in the game console 72 or pieces of music stored in the memory cartridge 48 when playing a game to the music as described later. A front side of the housing of the game console 72 is slightly slanted downward, and a plurality of paddle keys (four as in the embodiment) 82a, 82b, 82c and 82d are placed on the slant with proper intervals.

Figure 12:
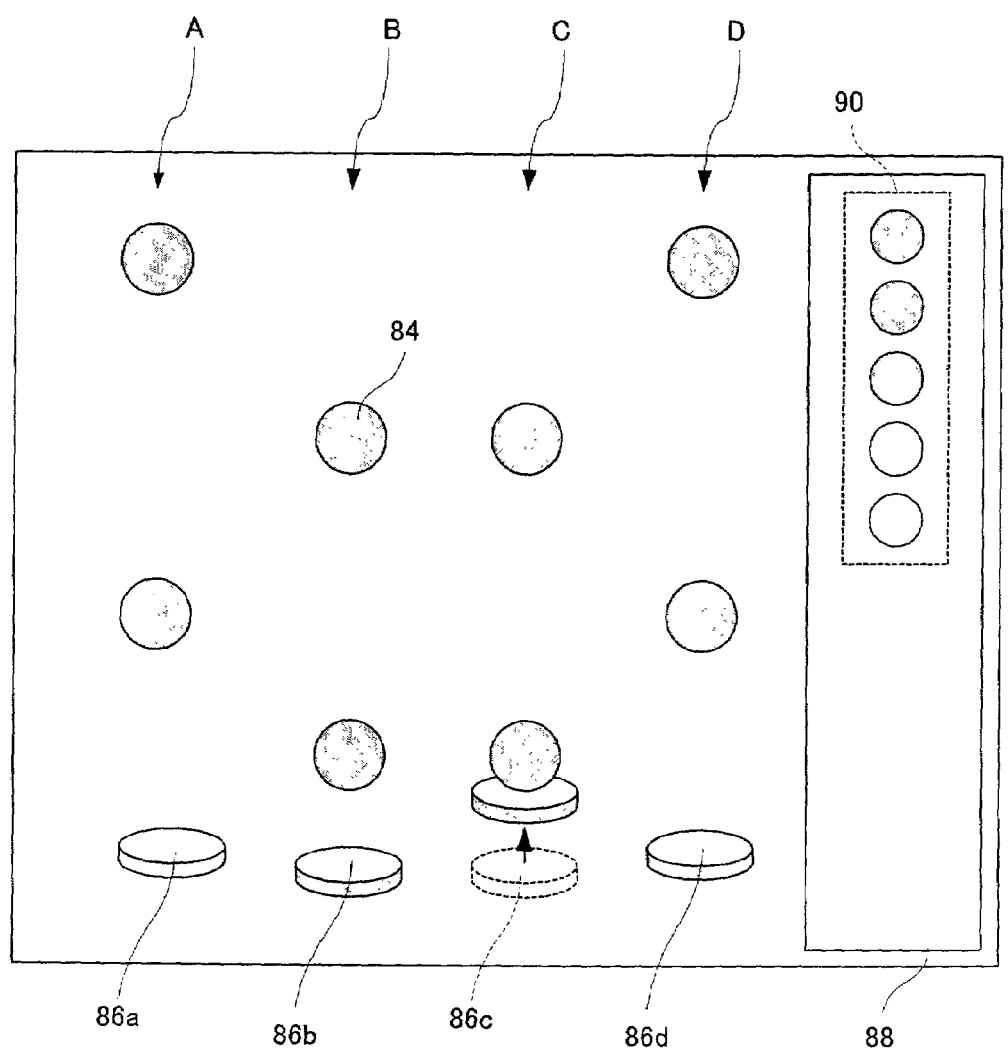
FIG. 12 is an illustrative view showing one example of a ball paddle game screen.

The ball paddle game device 70 presents a TV game screen shown in FIG. 12 on the television monitor. On the game screen, a plurality of ball moving paths (four as in the embodiment) A, B, C, and D are formed. Ball FIGS. 84 (hereinafter may be simply referred to as "ball") move on the path A–D, respectively. In this embodiment, the balls 84 are displayed as if they were falling. Falling of the balls 84 follows a predetermined pattern. For example, the balls drop in sequence in any arbitrary path out of four paths, or the balls drop in two or more paths simultaneously. Paddle figures (hereinafter, may be briefly referred to as "paddle") 86a, 86b, 86c and 86d are displayed in the game screen midway the respective moving paths on a straight horizontal line, for example, so as to receive the falling balls.

When the player selects a music by the music selection key 80 in the ball paddle game device 70, the music is played, and the balls 84 fall to rhythm or tempo of the music. The game player operates paddle keys 82a–82d as shown in FIG. 11, hitting a ball 84 skillfully by the paddles 86a–86d. If the ball is hit by the paddle successfully, the ball 84 is bounced upward by the paddles 86a–86d and lofted in the embodiment. If the paddle keys 82a–82d are operated in delayed timing and the ball 84 is unsuccessfully hit by the paddles 86a–86d, the ball 84 in the embodiment moves down and then vanished in a downward direction of the paddles 86a–86d. In the case of failure, a life is decreased at a life display portion 90 in a game information display portion 88 and one of life figures is gone out. Note that the life means the number of game plays that a game player can try.

Figure 13:
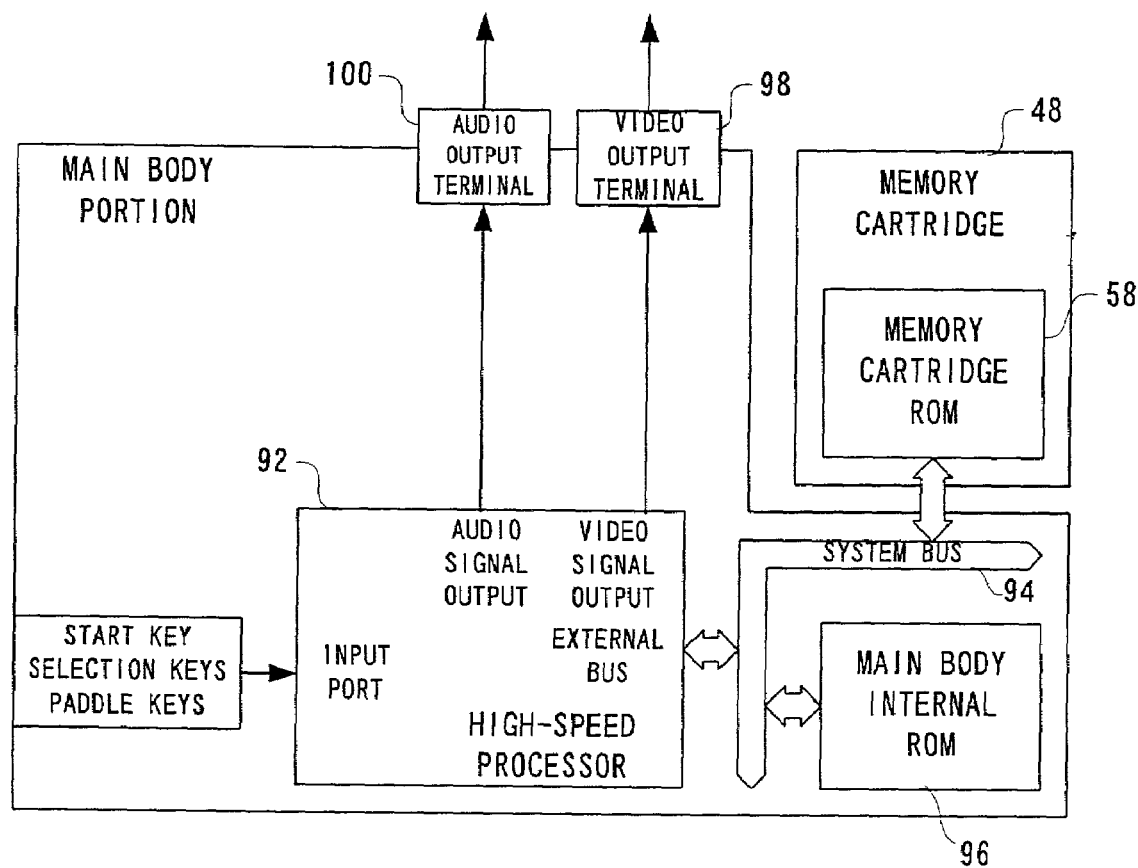
FIG. 13 is a block diagram showing a configuration of FIG. 11 embodiment.

As shown in FIG. 13, the game console 72 includes a game processor 92. As the game processor 92, the same processor as above-described processor 52 (referred to FIG. 2) is used. Accordingly, the game processor 92 includes various processors such as CPU (arithmetic and logical operation processor), graphic processor, sound processor, DMA processor, and etc. In addition, also included are an A/D converter for taking in an analog signal and an input/output control circuit which receives an input signal such as a key operating signal and gives an output signal to an external apparatus.

The CPU executes required operations in response to input signals, and then sends results thereof to other processors. The graphic processor executes a required graphic process depending upon a result of the operation and creates a changing game image. Likewise, the sound processor executes a required sound process depending upon a result of the operation.

An internal ROM 96 and a memory cartridge ROM 58 included in the memory cartridge 48 are coupled to the game processor 92 through a system bus 94. Accordingly, the processor 92 can access the ROMs 96 and 58 through the system bus 94, and video or image data for the ball FIG. 84 and the paddle FIGS. 86a–86d and music data of a plurality of pieces of music aforementioned are read therefrom.

Meanwhile, each keys 78, 80, and 82a–82d shown in FIG. 11 is inputted in an input port of the game processor 92, namely, an input/output control circuit. A video signal (for forming a game image) and an audio signal (music) from the game processor 92 are applied to a television monitor by way of the AV cable 74 through a video output terminal 98 and an audio output terminal 100.

Figure 14:
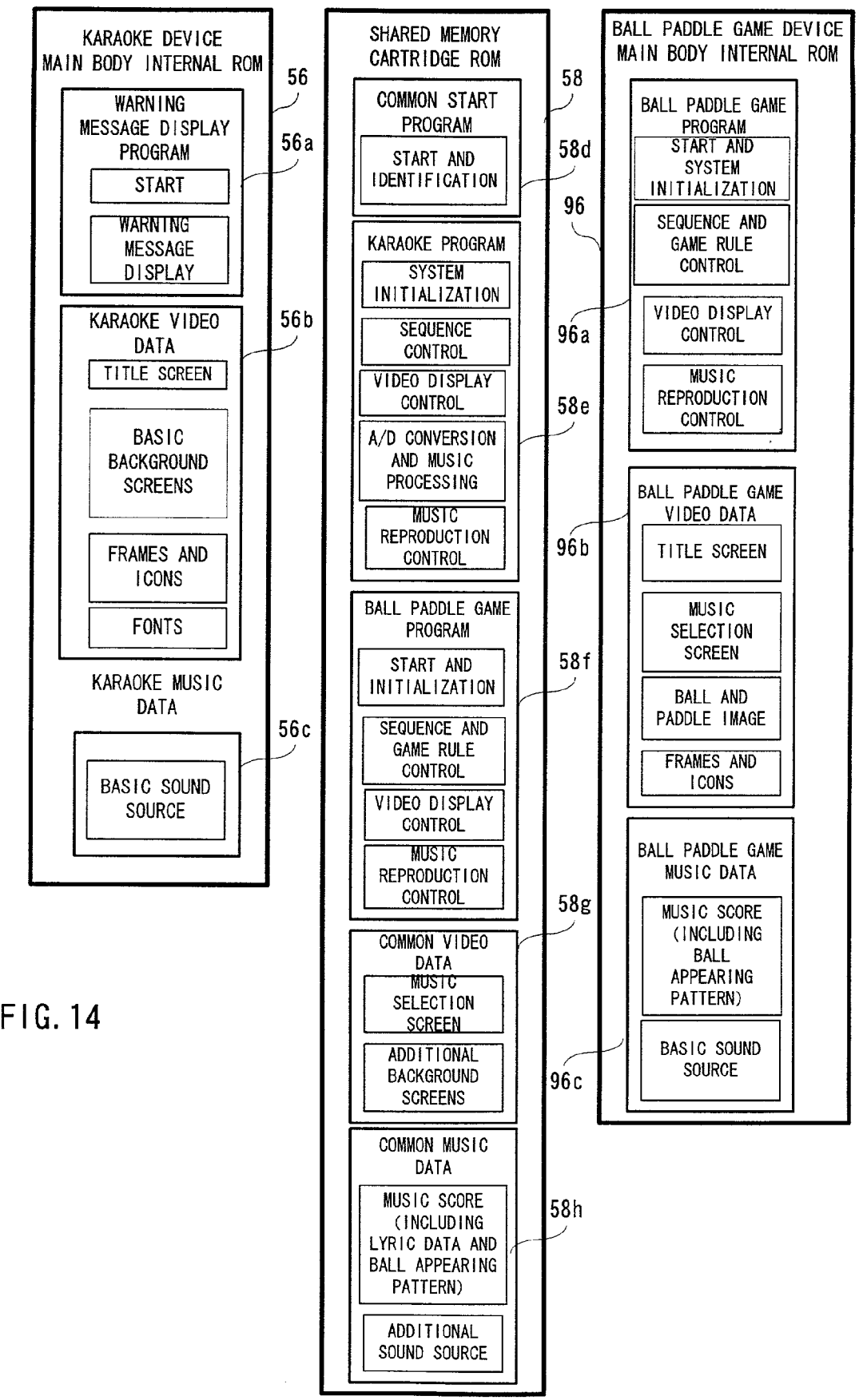
FIG. 14 is an illustrative view showing a stored state of programs and data in the internal ROM and the memory cartridge ROM of the karaoke device with built-in microphone, and the internal ROM of the ball paddle game device.

In this embodiment shown, the internal ROM 56 of the karaoke device with built-in microphone 10, the memory cartridge ROM 58 of the memory cartridge 48 and the internal ROM 96 of the ball paddle game device 70 are stored with programs and data as shown in FIG. 14. It is noted that contents stored in the internal ROM 56 is the same or similar to that of FIG. 3.

The memory cartridge ROM 58 is stored with a common start program 58d, a karaoke program 58e, a ball paddle game program 58f, common video data 58g, and common music data 58*h*. The common start program 58*d* is started in the device to which the memory cartridge 48 is attached or inserted, and determines whether the device to which the memory cartridge 48 is attached or inserted is the karaoke device with built-in microphone 10 or the ball paddle game device 70. The karaoke program 58*e* is a program to be executed at a time the device to which the memory cartridge 48 is attached or inserted is the karaoke device with built-in microphone 10, and executes processing such as start and system initialization, sequence control, image display control, A/D conversion and music processing, music reproduction control, and etc. The ball paddle game program 58*f* is a program to be executed at a time the device to which the memory cartridge 48 is attached or inserted is the ball paddle game device 70, and executes processing such as start and system initialization, sequence and game rule control, image display control, music reproduction control, and etc.

The common video or image data and the common music data are data available at a time the karaoke program 58*e* or the ball paddle game program 58*f* is executed. In other words, in either case that the device to which the memory cartridge 48 is attached or inserted is the karaoke device with built-in microphone 10 or the ball paddle game device 70, video or image data and sound data are generated based on the common video or image data and the common music data. The common video or image data includes music selection screen data and additional background screen data, and the common music data includes music score data (including lyric data and ball appearing pattern) and additional sound source data.

The ROM 96 is stored with a ball paddle game program 96*a*, ball paddle game video data 96*b*, and ball paddle game music data 96*c*. The ball paddle game program 96*a* is executed at a time the memory cartridge 48 is not attached or inserted, and executes processing such as start and system initialization, sequence and game rule control, image display control, music reproduction control, and etc. The ball paddle game video data 96*b* and the ball paddle game music data 96*c* are data available for processing the ball paddle game program 96*a*. The ball paddle game video data 96*b* includes title screen data, music selection screen data, ball and paddle image data, frame and icon data, and etc. The ball paddle game music data 96*c* includes music score (including ball appearing pattern) and basic sound source data. Accordingly, even if the memory cartridge 48 is not attached to the ball paddle game device 70, although the music and the ball appearing pattern are limited, it is possible to enjoy a game.

Figure 15:
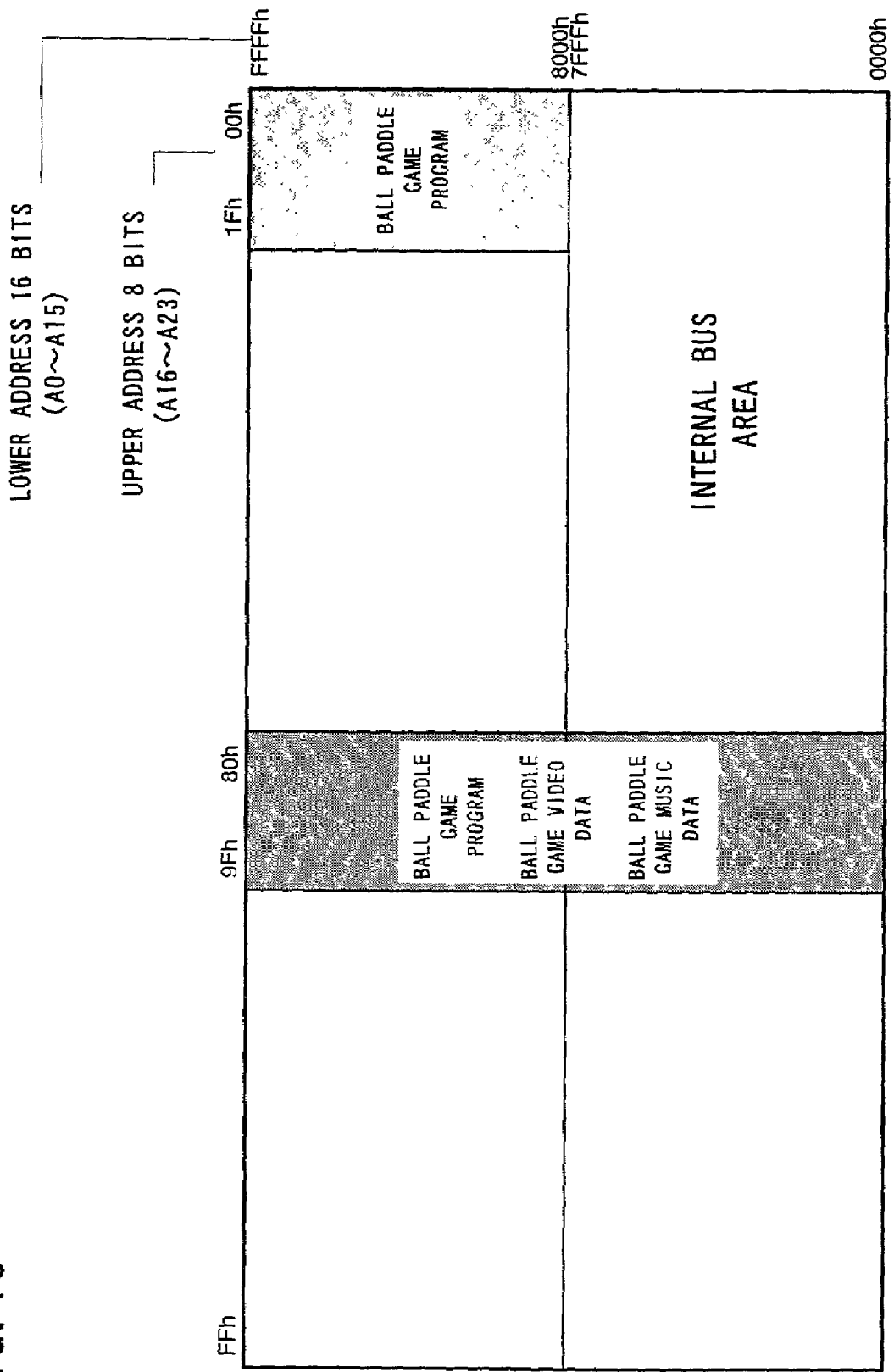
FIG. 15 is an illustrative view showing a mapping state of the address space when the memory cartridge is not attached to the ball paddle game device.

The connected state among the high-speed processor 92, the external ROM 58 and the internal ROM 96 is the same or similar to that of FIG. 6 and FIG. 7. Due to this, when the memory cartridge 48 is not attached to the ball paddle game device 70, the chip enable signal 1 is inputted into the CE input port of the internal ROM 56, and the ball paddle game program 96*a*, the ball paddle game video data 96*b*, and the ball paddle game music data 96*c* read out of the internal ROM 96 are mapped as shown in FIG. 15.

More specifically, the ball paddle game program 96*a* is mapped to an address space that the upper 8 bits indicate "00"-"1F" and the lower 16 bits indicate "FFFF"-"8000", and all the ball paddle game program 96*a*, the ball paddle game video data 96*b*, and the ball paddle game music data 96*c* are mapped to an address space that the upper 8 bits indicate "80"-"9F" and the lower 16 bits indicate "FFFF"-"0000". Since the high-speed processor 92 starts to access from an address space that the upper 8 bits are "00", when the power switch 76 is turned on in a state that the memory cartridge 48 is not attached, the ball paddle game program 96*a* is first executed.

Figure 16:
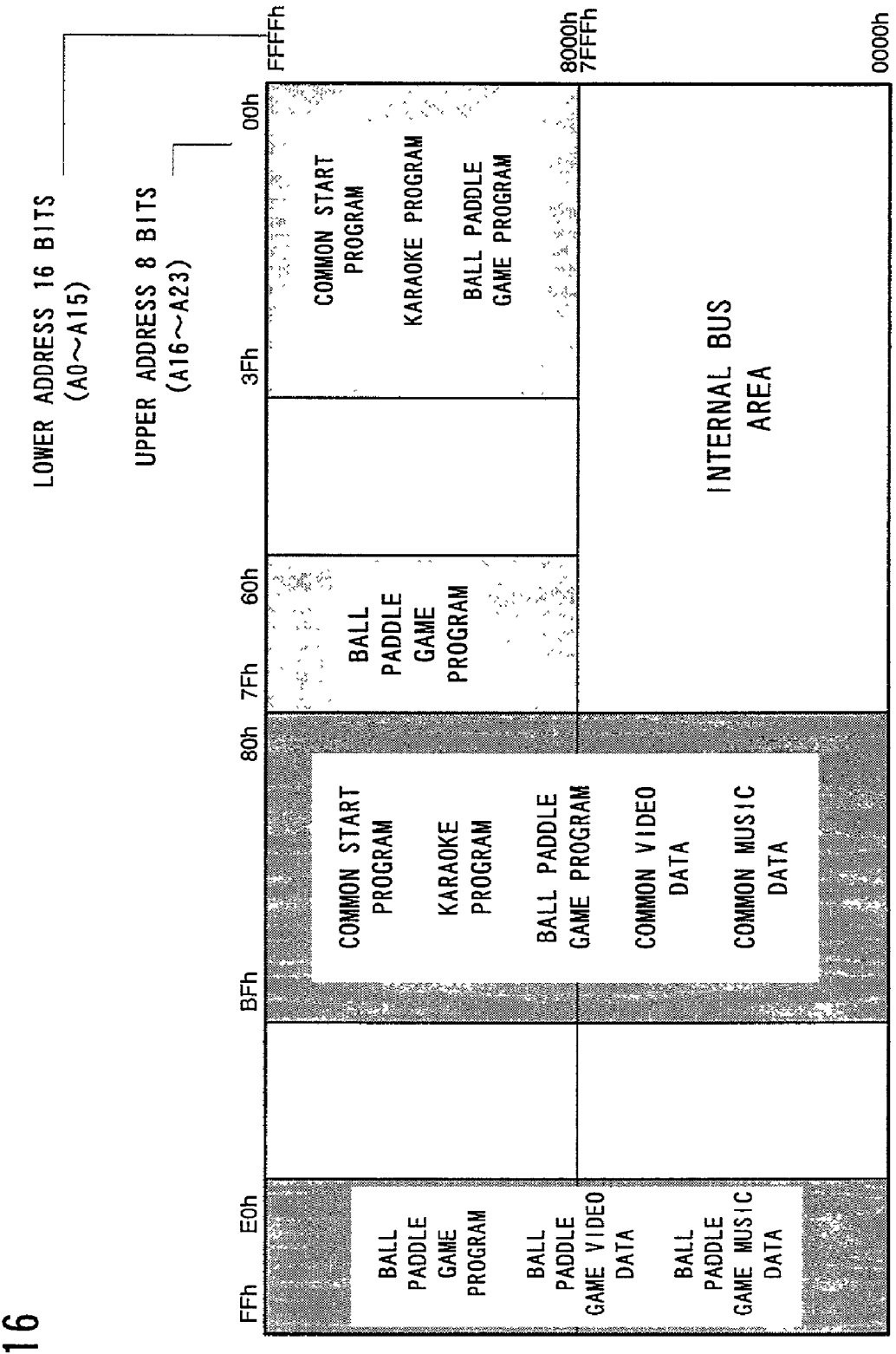
FIG. 16 is an illustrative view showing a mapping state of the address space when the memory cartridge is attached to the ball paddle game device.

When the memory cartridge 48 is attached to the ball paddle game device 70, the chip enable signal 2 is inputted into the CE input port of the internal ROM 96, and the chip enable signal 1 is inputted into the CE input port of the memory cartridge ROM 58. At this time, the ball paddle game program 96*a*, the ball paddle game video data 96*b* and the ball paddle game music data 96*c* read out of the internal ROM 96, and the common start program 58*d*, the karaoke program 58*e*, the ball paddle game program 58*f*, the common video data 58*g* and common music data 58*h* read out of the memory cartridge ROM 58 are mapped as shown in FIG. 16.

The ball paddle game program 96*a* is mapped to an address space that the upper 8 bits indicate "60"-"7F" and the lower 16 bits indicate "FFFF"-"8000", and the ball paddle game program 96*a*, the ball paddle game video data 96*b* and the ball paddle game music data 96*c* are mapped to an address space that the upper 8 bits indicate "E0"-"FF" and the lower 16 bits indicate "FFFF"-"0000". In addition, the common start program 58*d*, the karaoke program 58*e*, and the ball paddle game program 58*f* are mapped to an address space that the upper 8 bits indicate "00"-"3F" and the lower 16 bits indicate "FFFF"-"8000", and the common start program 58*d*, the karaoke program 58*e*, the ball paddle game program 58*f*, the common video data 58*g* and the common music data 58*h* are mapped to an address space that the upper 8 bits indicate "80"-"BF" and the lower 16 bits indicate "FFFF"-"0000". When the power switch 76 is turned on in a state that the memory cartridge 48 is attached, the high-speed processor 92 first executes the common start program 58*d*.

Figure 17:
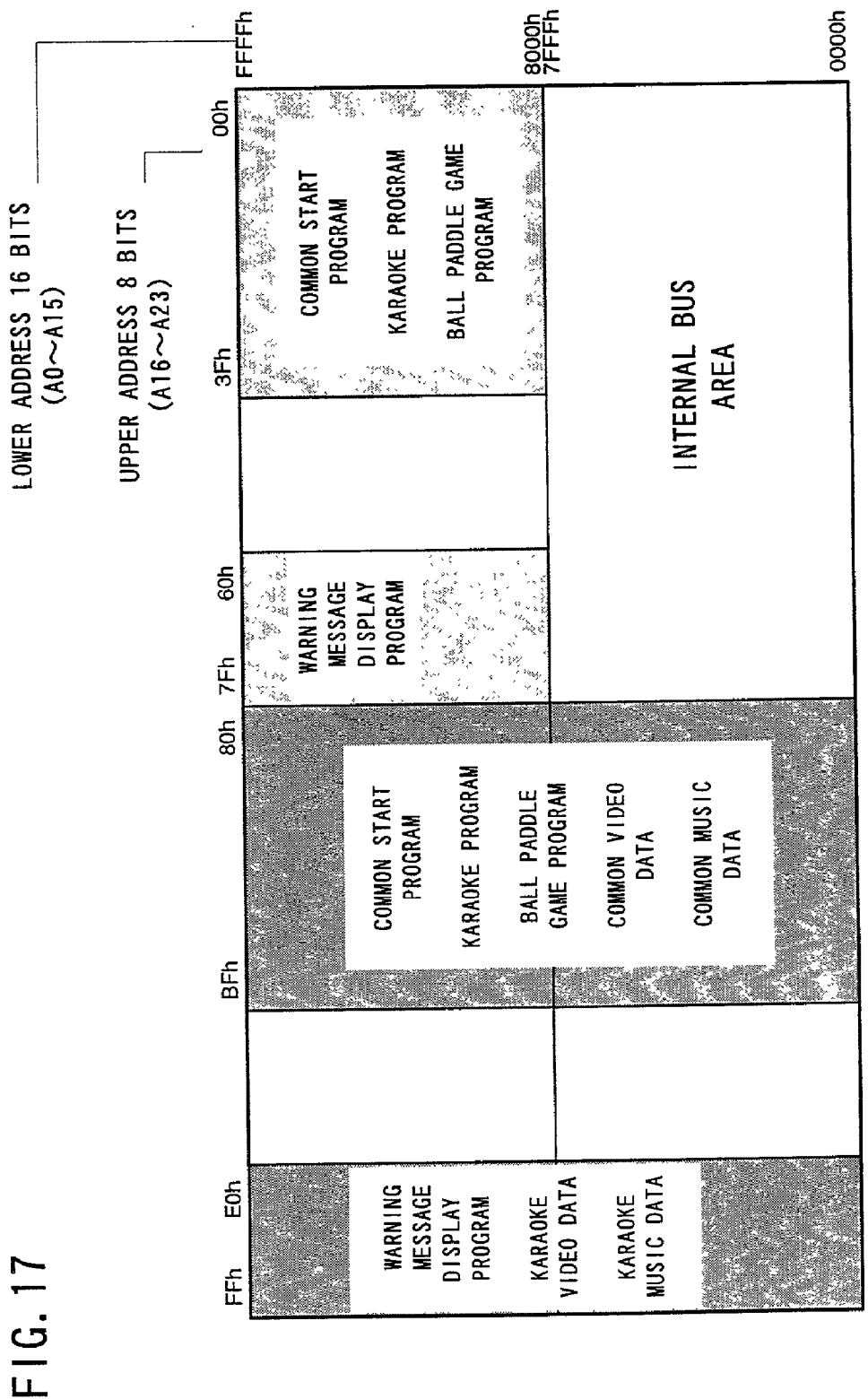
FIG. 17 is an illustrative view showing a mapping state of the address space when the memory cartridge is attached to the karaoke device with built-in microphone.

It is noted when the memory cartridge 48 shown in FIG. 14 is attached to the karaoke device with built-in microphone 10, the warning message display program 56*a*, the karaoke video data 56*b* and the karaoke music data 56*c* read out of the internal ROM 56, and the common start program 58*d*, the karaoke program 58*e*, the ball paddle game program 58*f*, the common video data 58*g* and the common music data 58*h* read out of the external ROM 58 are mapped as shown in FIG. 17.

Figure 18:
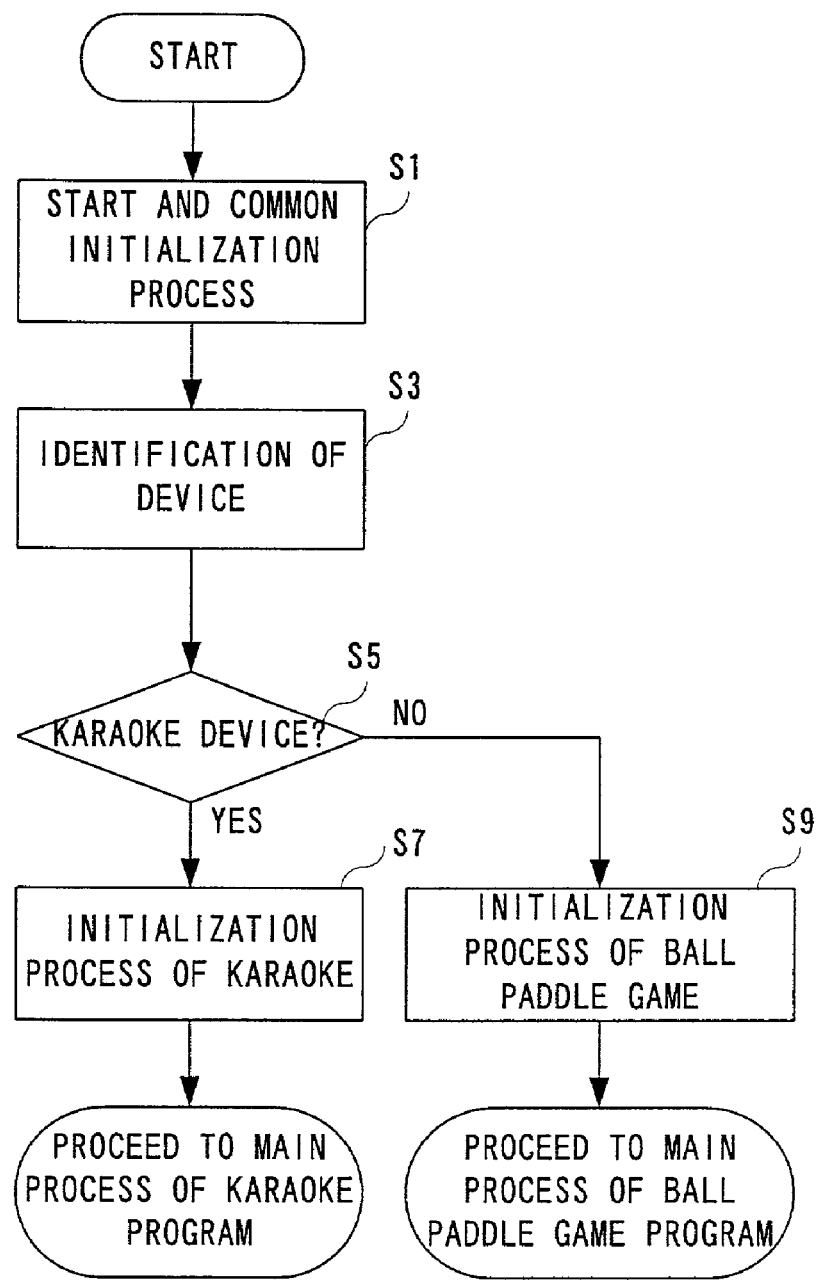
FIG. 18 is a flowchart of a common start program.

The high-speed processor 92 of the ball paddle game device 70 or the high-speed processor 52 of the karaoke device with built-in microphone 10, when the memory cartridge 48 is attached, executes the common start program according to a flowchart shown in FIG. 18. First, in a step S1, start and common initialization processing is executed, and identification of devices is executed in a step S3. More specifically, both the internal ROM 96 of the ball paddle device 70 and the internal ROM 56 of the karaoke device with built-in microphone 10 are stored with identifiers to specify the devices, and based on these identifiers, it is determined whether the device to which the memory cartridge 48 is attached is the ball paddle game device 70 or the karaoke device with built-in microphone 10. If the device to which the memory cartridge 48 is attached is the karaoke device with built-in microphone 10, "YES" is determined in a step S5, and initialization processing of a karaoke is executed in a step S7, and in turn, proceeding to main processing of the karaoke program. On the other hand, if the device to which the memory cartridge 48 is attached is the ball paddle game device 70, "NO" is determined in the step S5, and initialization processing of a ball paddle game is executed in a step S9, and then, proceeding to main processing of the ball paddle game program.

Thus, since the high-speed processor 92 or 52 processes the common start program at first and identifies the devices to which the memory cartridge is attached, it is possible to use the memory cartridge 48 in different kinds of devices.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for executing a program stored on a memory cartridge, comprising:
    providing a single memory cartridge storing each of at least one karaoke program and at least one game program;
    determining whether the memory cartridge is attached to a main body of a karaoke apparatus;
    determining whether the memory cartridge is attached to a main body of a gaming apparatus that is separate from the karaoke apparatus;
    if the memory cartridge is attached to the main body of a karaoke apparatus, selecting a karaoke program from the at least one karaoke program stored on the memory cartridge;
    if the memory cartridge is attached to the main body of a gaming apparatus, selecting a game program from the at least one game program stored on the memory cartridge; and
    executing the selected program.

2. The method of claim 1, wherein determining whether the memory cartridge is attached to a main body of a karaoke apparatus or to the main body of a gaming apparatus includes judging an identifier stored in a main body.

3. The method of claim 1, wherein each karaoke program and each game program stored on the memory cartridge corresponds to an identifier.

4. The method of claim 3, wherein, if the memory cartridge is attached to the main body of a karaoke apparatus, the selected karaoke program is selected based on the corresponding identifier.

5. The method of claim 4, wherein, if the memory cartridge is attached to the main body of a karaoke apparatus, the selected karaoke program corresponds to an identifier that is stored in the main body of the karaoke apparatus.

6. The method of claim 3, wherein, if the memory cartridge is attached to the main body of a gaming apparatus, the selected game program is selected based on the corresponding identifier.

7. The method of claim 6, wherein, if the memory cartridge is attached to the main body of a gaming apparatus, the selected game program corresponds to an identifier that is stored in the main body of the gaming apparatus.

8. The method of claim 1, wherein the memory cartridge also stores a start program, and wherein the start program determines whether the memory cartridge is attached to a main body of a karaoke apparatus or to the main body of a gaming apparatus by judging an identifier stored in a main body.

9. A method according to claim 1, further comprising a warning step wherein if a memory cartridge is not attached to the main body of the karaoke apparatus, selecting a warning message program stored in the main body of the karaoke apparatus, and executing the selected program; or if a memory cartridge is not attached to the main body of the gaming apparatus, selecting a warning message program stored in the main body of the gaming apparatus, and executing the selected program.

10. A system for executing a program stored on a memory cartridge, the memory cartridge storing at least one karaoke program and at least one game program, comprising:
    means for determining whether the memory cartridge is attached to a main body of a karaoke apparatus;
    means for determining whether the memory cartridge is attached to a main body of a gaming apparatus that is separate from the karaoke apparatus;
    means for selecting a karaoke program from the at least one karaoke program stored on the memory cartridge, the programs stored in the memory cartridge including at least one game program and at least one karaoke program, if it is determined that the memory cartridge is attached to the main body of a karaoke apparatus;
    means for selecting a game program from the at least one game program stored on the memory cartridge if it is determined that the memory cartridge is attached to the main body of a gaming apparatus; and
    means for executing the selected program.

11. A method for executing a program stored on a memory cartridge according to claim 1, further comprising:
    providing common music data, said common music data being common to both the karaoke program and the game program; and
    wherein executing the selected program, includes accessing the common music data.

12. A system for executing a program stored on a memory cartridge according to claim 10, further comprising:
    common music data, said common music data being common to both the karaoke program and the game program, wherein the common music data are available for execution of the karaoke program and the game program.

* * * * *